March 24, 1959  G. WIKKENHAUSER  2,878,672
FLUID CURRENT INDICATORS

Filed Dec. 28, 1954  2 Sheets-Sheet 1

INVENTOR
G. WIKKENHAUSER
BY
Moore & Hall
ATTORNEYS

March 24, 1959     G. WIKKENHAUSER     2,878,672
FLUID CURRENT INDICATORS

Filed Dec. 28, 1954     2 Sheets-Sheet 2

INVENTOR
G. WIKKENHAUSER
BY
Moore & Hall
ATTORNEYS

United States Patent Office 2,878,672
Patented Mar. 24, 1959

2,878,672

FLUID CURRENT INDICATORS

Gustav Wikkenhauser, Glasgow, Scotland, assignor to Kelvin & Hughes Limited, Glasgow, Scotland, a British company Application December 28, 1954, Serial No. 478,161

Claims priority, application Great Britain January 5, 1954

4 Claims. (Cl. 73—189)

This invention relates to fluid current indicators comprising a hollow captive member open at one end and adapted to stream in the current. In one form of such indicator described in the specification of British patent application No. 7,722 of 1953 the hollow member carries means freely susceptible for a pre-determined period to gravity and to the earth's magnetic field, and means operative when that period has elapsed to hold such means fixed relative to the captive member and so cause or enable it to indicate the direction and inferentially the speed of the current during said period or part thereof. The captive member may be a hollow member such as a cone secured at its apex to a mooring line attached at one end to a weight and at the other to a buoy. The means susceptible to magnetism may be a compass which is either itself pendulous or mounted in a pendulous carrier; means for holding the compass card fixed after a pre-determined time may comprise:

(a) A material which is for that time rendered liquid and in which the compass card can then float but which congeals or solidifies thereafter; or (b) A positive or frictional locking device which grips the compass card by the pressure of a spring released after that time, e.g. by the solution in the ambient liquid of a soluble pellet by which the spring is until then constrained. Where the compass is mounted in a pendulous carrier the release of the spring just referred to may effect positive locking of the carrier, e.g. by engagement of a pointed plunger in a foraminous track.

In another known current indicator (known as the Robert's current indicator) the hollow body is a stream lined closed body and carries electrical means for indicating strength and direction of currents, and carries fixed fins at the rear for stabilising it in the current.

Both forms of such indicators have a tendency to be unstable at low speeds, that is to say, subject to sway and oscillation. We have now found a simple and surprisingly effective way of overcoming this difficulty.

According to the present invention the captive member consists of or includes a hollow body having a large number of small perforations providing a steadying effect thereon. The perforations produce a damping effect presumably due to eddy currents produced in the perforations and steady the hollow body in the flowing stream.

The perforations may be provided more or less regularly over the whole of the hollow body. For example, the hollow body may be a cone or like member and may be made of flattened expanded metal, wire gauze, or perforated metal sheet, e.g. zinc. This cone may itself constitute the captive member or may be attached to a captive member as a part thereof.

In order that the present invention may be more fully understood and carried into effect an embodiment thereof together with a method of its use will now be described by way of example with reference to the accompanying drawings in which.

Figure 1:
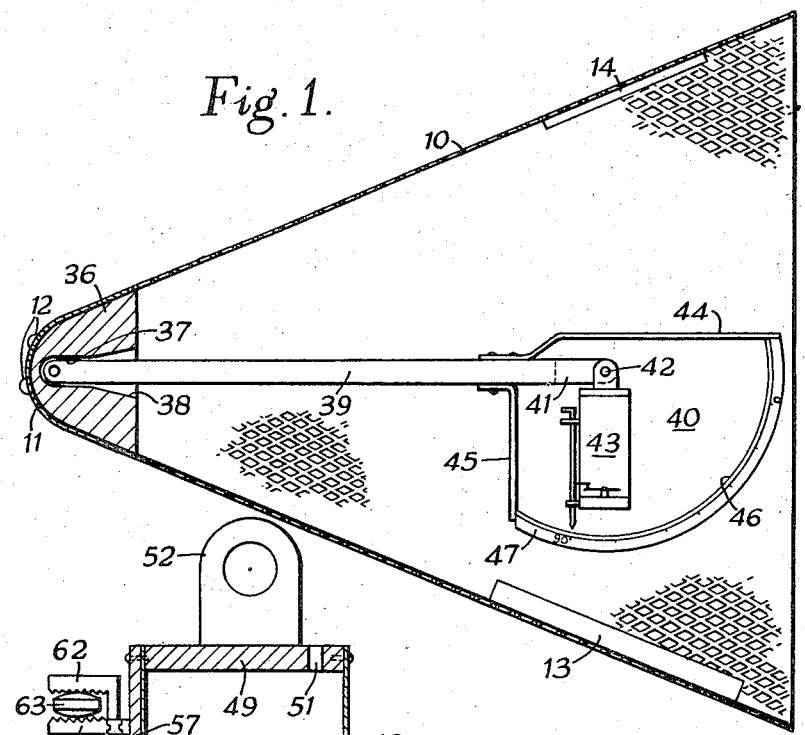
Figure 1 is a diagrammatic longitudinal cross-section of one form of current indicator.
Figure 2:
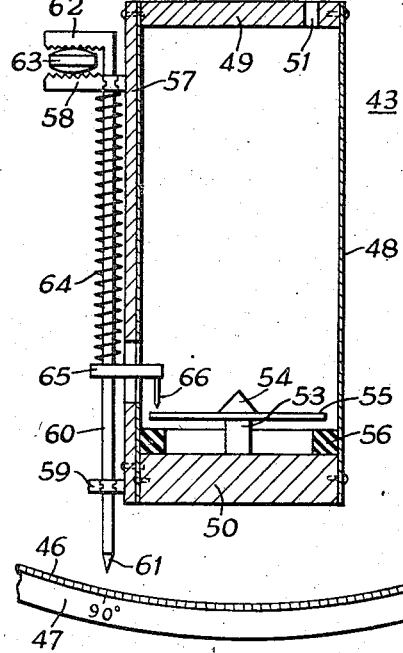
Figure 2 is a detailed view of the pendulous element shown in Figure 1.
Figure 4:
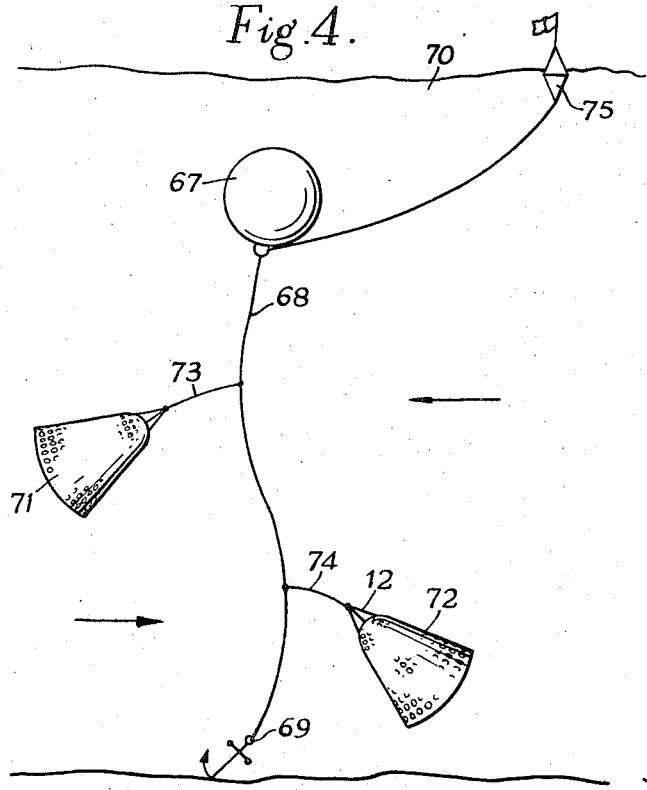
Figure 4 shows diagrammatically the use of a submarine current indicator in accordance with the invention for recovery by ship a short time after laying.

The submarine current indicator illustrated in Figures 1, 2 and 4 comprises an open ended cone 10 formed with a rounded nose 11 and made of foraminous light metal sheet or other non-magnetic substance which is unaffected by immersion in sea water. The sheet has a very large number of perforations over the whole of its walls except at its smaller end where it is closed by suitable means such as a block 36 or by merely using unperforated sheet at this end. The nose 11 carries anchorage means in the form of three external eyes or lugs 12; all other fittings and mechanisms of the device are mounted inside the cone 10. When the cone 10 is anchored in the water it constitutes an orientatable captive member which streams in the current. Near the open end of the cone may be provided at the bottom a fixing 13 for ballast which could if required be in the form of a depth indicator, and at the top a fixing 14 for a plastic covered questionnaire paper. All the equipment described above and hereinafter save the compass is required to be of non-magnetic material.

The nose 11 is integral with the body portion of cone 10. The member 36 is a solid or sheet metal anchorage slotted at 37 and belled at 38 to receive a bar 39 carrying the recording unit 40. The member 36 closes the smaller end of the hollow cone. Bar 39 and member 36 are formed with holes which coincide when bar 39 is in operative position and through which a locking pin not shown may be passed through the cone nose 11 and suitably secured therein. The other end 41 of bar 39 is forked and carries a spindle 42 on which is pendulously mounted the gravity responsive member 43 of unit 40. Adjacent spindle 42 are upper and lower supports 44, 45 between which is mounted an arcuate strip 46 of metal gauze whose centre is coincident with the axis of spindle 42. A scale 47 mounted along the edge of strip 46 is graduated in degrees from 0 degree (horizontal) to 90 degrees (vertical). The pendulous member 43 comprises a hollow cylinder 48 of transparent material such as methyl methacrylate, or the like known to the trade as "Perspex," "Plexiglas" and "Lucite," attached to upper and lower brass endplates 49, 50. Endplate 49 is provided with an air vent 51 and has attached thereto the lug 52 by which it is pendulously mounted on spindle 42. The lower endplate 50 is detachably secured to the cylinder 48 and being heavier than endplate 49 serves as the main weight of the pendulous body. On the upper surface of endplate 50 is formed a pivot 53 on which is rotatably mounted a magnetic compass 54 carrying a disc type compass card 55. Immediately below the card 55 is mounted a ring 56 of rubber or wax the purpose of which is to support the card when as hereinafter described it is clamped. At one side of cylinder 48 is secured a metal strip 57 extending from top to bottom and provided with upper and lower guides 58, 59 in which can slide a rod 60 formed at its lower end with a locking device or stylus point 61 and at its upper end with an arm 62 which co-operates with part of guide 58 to grip a soluble tablet 63 which is firmly held between teeth on members 58 and 62 which are urged towards each other by a compression spring 64 carried on rod 60 which is provided with an arm 65 which projects within cylinder 48 and has a downwardly directed locking device or pin 66. When the device is set for use the parts thereof occupy the positions shown in Figure 2 in which the soluble tablet 63 prevents spring 64 from causing pin 66 to engage and grip the compass card 55 and from causing the stylus point 61 from entering and engaging a perforation in the metal gauze track 46. The device shown in Figure 1 is in operation sent down to the desired depth in the sea and when tablet 63 dissolves spring 64 causes engagement between pin 66 and card 55 and also between point 61 and the track 46. The angular positions of compass card 55 and pendulous body 43 in relation to the members supporting them provide information from which can be read or inferred the direction and velocity of the water current in which the device is immersed when tablet 63 dissolves.

Figure 3:
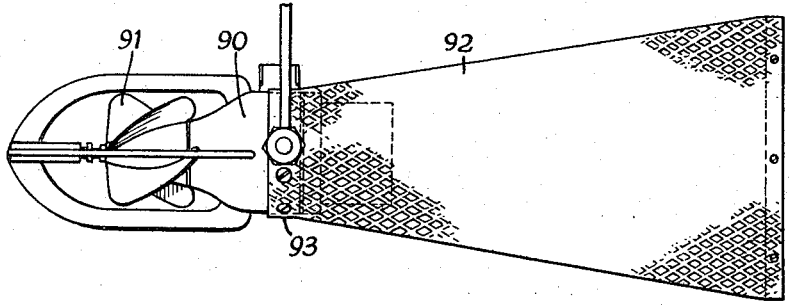
Figure 3 shows the invention applied to a Robert's current indicator.

Figure 3 shows a Robert's current indicator in the form of a streamlined body 90 containing electrical devices operated by a propeller 91. Instead of the usual fins there is provided a hollow foraminous cone 92 welded at its small end 93 to the body 90.

One method of use of the indicator described in connection with Figures 1 and 2 is diagrammatically shown in Figure 4. This method is for use where recovery by ship is intended, normally a short time after laying the device. Here a buoy 67 is moored by a rope 68 attached at its lower end to an anchor or other suitable weight 69 so that the buoy 67 floats below the surface 70 of the sea. Submarine current indicators such as 71 and 72 are secured in any desired numbers to the mooring rope 68 by short stray lines 73, 74 attached to the fixing eyes 12 of the indicator nose. A float 75 and flag is made fast to buoy 67 by a stray line 76 to assist in quick recovery of the device.

I claim:

1. A fluid current indicator comprising a hollow body member, means to maintain said body member submerged in a fluid current the velocity and direction of flow of which are to be determined, said means including a flexible means connected between one end of the body member and a submerged anchorage device and acting to tether said member whereby said body member will be oriented in accordance with both direction and velocity of current flow, and indicating means carried by said body and responsive to the orientation of said body, said indicating means comprising a pendulous frame pivotally mounted within said hollow body member, a curved scale mounted within said hollow body member and having its center of curvature on the pivot of said supplemental frame and an indicator element carried by said pendulous frame, said pendulous frame having sufficient mass to move in response to gravity about its pivotal mounting, said indicator element being spring biased toward said curved scale and held free of said scale by a water soluble tablet which upon dissolution frees said indicator element for movement into engaging relation with said curved scale whereby to determine the position of said hollow body member and thereby the rate of fluid flow, said indicating means comprising a compass, said indicator element having means engaging said compass and fixing a reading thereof upon dissolution of said tablet.

2. The combination set forth in claim 1, said compass comprising a circular disc mounted on such said pendulous frame and movable therewith.

3. The combination set forth in claim 1, said indicating means comprising a positive locking device which grips said compass under pressure of said spring, said positive locking device comprising a pointed plunger and a foraminous track positioned for engagement by the point.

4. The combination set forth in claim 3, said compass comprising a compass card pivotally mounted on said pendulous frame, said indicating element comprising another locking device constructed to grip said card upon dissolution of said tablet.

References Cited in the file of this patent
UNITED STATES PATENTS

| | | |
|---|---|---|
| 597,572 | Burdett | Jan. 18, 1898 |
| 1,655,125 | Baule | Jan. 3, 1928 |
| 1,742,574 | Breedlove | Jan. 7, 1930 |
| 2,592,583 | Lyon | Apr. 15, 1952 |
| 2,805,572 | Carruthers | Sept. 10, 1957 |